United States Patent
Takahashi

[11] 3,817,603
[45] June 18, 1974

[54] PHOTOGRAPHIC OBJECTIVE HAVING GLASS OF A HIGH INDEX OF REFRACTION

[75] Inventor: Yasuo Takahashi, Tokyo, Japan

[73] Assignee: Asahi Kogaku Kogyo Kabushiki Kaisha, Tokyo, Japan

[22] Filed: May 18, 1972

[21] Appl. No.: 254,424

[30] Foreign Application Priority Data
May 24, 1971  Japan................................ 46-35396

[52] U.S. Cl.................................. 350/218, 350/176
[51] Int. Cl............................................... G02b 9/60
[58] Field of Search............................ 350/218, 176

[56] References Cited
UNITED STATES PATENTS
3,519,333  7/1970  Takahashi....................... 350/176 X FOREIGN PATENTS OR APPLICATIONS
867,261    5/1961  Great Britain...................... 350/218
1,018,237  5/1957  Germany........................... 350/218

*Primary Examiner*—John K. Corbin
*Attorney, Agent, or Firm*—Steinberg & Blake

[57] ABSTRACT

A photographic objective using glass of a high index of refraction. The objective has a Petzval sum which is not undesirably large and it has a negative radius of curvature at the rear surface of the front lens in order to minimize distortion while compensating for this factor by other features.

1 Claim, 5 Drawing Figures

PHOTOGRAPHIC OBJECTIVE HAVING GLASS OF A HIGH INDEX OF REFRACTION

BACKGROUND OF THE INVENTION

The present invention relates to photographic objectives.

In particular, the present invention relates to photographic objectives using glass of a high index of refraction.

In general with photographic objectives of this type it is not always possible to maintain the Petzval sum as low as desired, without over-decreasing this value. Attempts to achieve a highly efficient objective require a compromise between various advantages obtained from certain features but which carry with them certain undesirable aberrations and the like. With conventional lenses the various conflicting factors do not always present the best possible compromise. Thus, while it is desirable to prevent distortion by utilizing a negative radius of curvature for the rear surface of the front lens, such a construction is seldom encountered because of various undesirable features which are inherent with such a negative radius of curvature.

SUMMARY OF THE INVENTION

It is accordingly a primary object of the present invention to provide a highly efficient photographic objective using glass of a high index of refraction.

In addition it is an object of the invention to use a photographic objective of this type provided with a negative radius of curvature at the rear surface of the front lens while at the same time effectively compensating for disadvantages which might otherwise result from this feature.

Yet another object of the present invention is to provide a photographic objective of the above type which is well balanced with respect to coma and other aberrations.

According to the invention the photographic objective is composed of six lenses designated I–VI from front to rear and having lenses IV and V cemented together with the entire lens system having for a focal length of 100 mm the data which appears below in Table 1.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
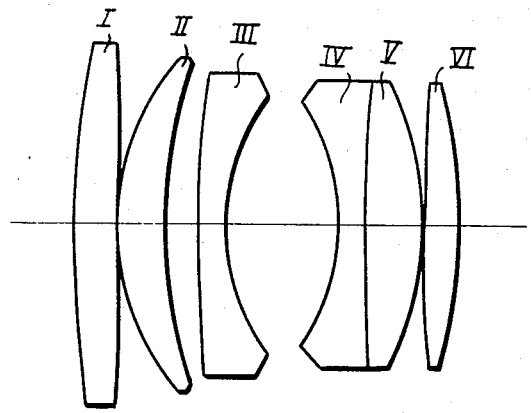
FIG. 1 schematically illustrates a photographic objective according to the invention having its several lenses designated I–VI from front to rear.

Referring to FIG. 1, lens I of the photographic objective of the invention is of a positive, double convex type, and thus is not a meniscus type of lens. Lens II is a positive meniscus lens. Lens III is a negative meniscus lens. Lenses IV and V are cemented together with Lens IV being a negative type of lens while lens V is a positive type of lens. The rear lens VI is a positive type of lens.

This lens system of FIG. 1 is characterized by the following conditions:

(1) $n_1, n_2, n_5, n_6 > 1.77$
(2) $(v_1 + v_2 + v_3) / 3 > 38$
(3) $F / 1.7 < F_{1.2} < F / 1.45$
(4) $R_2 < 0, 5F < |R_2| < \infty$
(5) $0.2 > n_5 - n_4 > 0.1$
(6) $0.7F < R_4 < 1.5F$ where $F$ is the resultant focal length of the whole lens system;

$F_{1.2...i}$ is the resultant focal length given by the first to the i-th lens;

$R_j$ is the radius of curvature of the j-th surface;

$n_i$ is the index of refraction with respect to d-line of the i-th lens; and $v_i$ is the Abbe number ($v$ value) of the i-th lens.

The values of $n_1$ and $n_2$ in condition 1 in conjunction with condition 3 are simple means for preventing an undesirable increase in the Petzval sum as well as means for not undesirably increasing aberrations. When large $v$ values are used for both $v_1$ and $v_2$, then it is not necessary to use a lens of exceedingly small $v$ value for lens III, so that it is possible to use glass which does not have a particularly high index of refraction. This factor also serves to decrease the Petzval sum. The condition that $n_5$ and $n_6$ are larger than 1.77 contributes also to minimizing aberrations and the Petzval sum. These factors are highly influenced by condition 3. Naturally if $F_{1.2}$ is less than $F / 1.7$, then the Petzval sum will be over-decreased, while if $F_{1.2}$ is greater than $F / 1.45$, other elements must correct chromatic aberration and compensate for an increase in the Petzval sum. Such a construction would cause undesirable influence over the various aberrations and is not suitable for the lens system of the invention.

Condition 4 is one of the main features of the present invention. Generally when the radius of curvature of the rear surface of lens I is negative, a narrow angle is likely to result, coma aberration is aggravated with respect to light bundles of a large image angle, and compensation by other means is difficult to carry out so that such a negative radius of curvature is not desirable. However, with the present invention such a negative radius of curvature is indeed used while reliance is instead made, contrary to conventional practice, on other means to compensate for the above disadvantages, using condition 4 to prevent or minimize distortion. A standard objective of 1:1.8 or so is at the present time not very bright, and with such an objective it is desirable to provide smaller distortion than is conventionally encountered. When the value of $R_2$ is smaller than $-5F$ these disadvantages become undesirably large and there would be an undesirable increase in positive distortion, so that the objects of the present invention would not be achieved and such a feature is not used. A positive value of $R_2$ would result in increased negative distortion, and the feature of condition 4 would be lost. Accordingly, the range of condition 4 is highly suitable for the present invention.

Condition 5 is one means for correcting coma aberration which is likely to appear in objectives of the type according to the present invention. This condition 5 is a factor for rendering operative a coefficient of spherical aberration of a higher order in cooperation with $R_3$. The latter is the radius of curvature at the common surface between the cemented lenses IV and V which respectively have the refractive indexes $n_4$ and $n_5$. If $n_5 - n_4$ is less than 0.1, the above effect is not encountered. It is undesirable that this value be larger than 0.2 since in this event correction is difficult to carry out. This factor becomes particularly apparent with respect to light rays of comparatively low incidence height.

Condition 6 compensates for the defect of condition 4 and is one of the factors of the objective of the invention for making the lens system of the invention well balanced with respect to coma and other aberrations under condition 3. If $R_4$ is larger than $1.5F$, there is not only an aggravation of coma aberration of light rays of comparatively high incidence height, but also there is an undesirable influence upon spherical aberration and in addition it can be expected that there will be an aggravation of coma aberration with respect to light rays of comparatively low angle of incidence and of comparatively low height of incidence. A value of $R_4$ which is less than $0.7F$ would place an excessive burden upon $R_3$, so that it would be impossible with such construction to obtain a bright objective.

Data for an objective of the invention are presented below in Table 1 for a focal length of 100 mm for the entire lens system, where $t_1$, $t_2$, etc., are the dimensions of the successive lenses along the principal axis while $d_1$, $d_2$ etc., are the dimensions of the space along the principal axis between the successive lenses. The refractive index n is with respect to the d-line, as referred to above.

TABLE 1

| Lens | F=100 mm | | | Glass Constants | |
|---|---|---|---|---|---|
| | | | | n | ν |
| I | $R_1$=+139.28 mm | | | | |
| | | $t_1$=6.99 mm | | 1.81600 | 46.8 |
| | $R_2$=−16328.50 mm | | | | |
| | | $d_1$=0.19 mm | | | |
| | $R_3$=+44.89 mm | | | | |
| II | | $t_2$=7.99 mm | | 1.81600 | 46.8 |
| | $R_4$=+94.93 mm | | | | |
| | | $d_2$=5.17 mm | | | |
| | $R_5$=+205.55 mm | | | | |
| III | | $t_3$=4.73 mm | | 1.72825 | 28.3 |
| | $R_6$=+34.83 mm | | | | |
| | | $d_3$=18.98 mm | | | |
| | $R_7$=−38.37 mm | | | | |
| IV | | $t_4$=4.82 mm | | 1.66680 | 33.1 |
| | $R_8$=+728.12 mm | | | | |
| V | $R_9$=−52.83 mm | $t_5$=9.01 mm | | 1.81600 | 46.8 |
| | | $d_4$=0.19 mm | | | |
| | $R_{10}$=+460.21 mm | | | | |
| VI | | $t_6$=5.53 mm | | 1.81600 | 46.8 |
| | $R_{11}$=−109.11 mm | | | | |
| | $F_{1,2}$=62.12 mm | | | | |

The five von Seidel conditions are set forth in the coefficients of Table 2 below where the successive lens surfaces are arranged in order in the first column with surface 8 being the common surface between the cemented lenses IV and V.

TABLE 2

Von Seidel Coefficients

| Surface | $S_1$ | $S_2$ | $S_3$ | P | $S_5$ |
|---|---|---|---|---|---|
| 1 | +0.092 | +0.039 | +0.017 | +0.323 | +0.145 |
| 2 | +0.144 | −0.379 | +1.002 | +0.003 | −2.651 |
| 3 | +0.309 | −0.085 | +0.024 | +1.001 | −0.283 |
| 4 | +0.368 | −0.935 | +2.375 | −0.476 | −4.823 |
| 5 | −0.0162 | +2.126 | −3.888 | +0.205 | +6.736 |
| 6 | −0.652 | −0.012 | 0 | −1.209 | −0.023 |
| 7 | −1.897 | +2.042 | −2.197 | −1.042 | +3.485 |
| 8 | +0.033 | +0.039 | +0.046 | +0.007 | +0.062 |
| 9 | +1.252 | −1.248 | +1.244 | +0.850 | −2.088 |
| 10 | −0.004 | +0.034 | −0.275 | +0.098 | +1.438 |
| 11 | +1.704 | −1.673 | +1.643 | +0.412 | −2.018 |
| SUM | +0.185 | −0.053 | −0.010 | +0.170 | −0.019 |

Figure 2A:
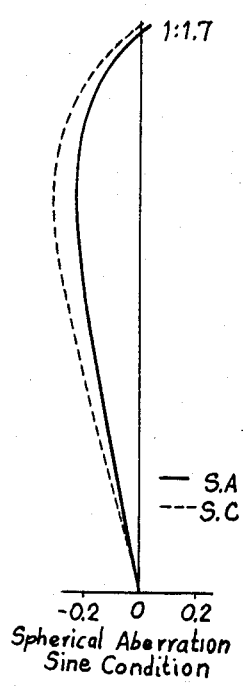
FIGS 2A–2D respectively illustrate aberration curves of the objective of the invention.
Figure 2B:
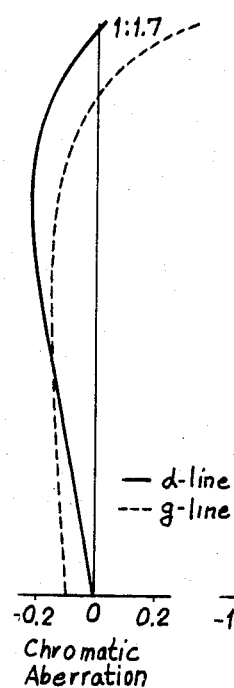
Figure 2C:
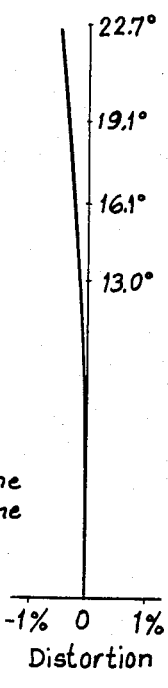
Figure 2D:
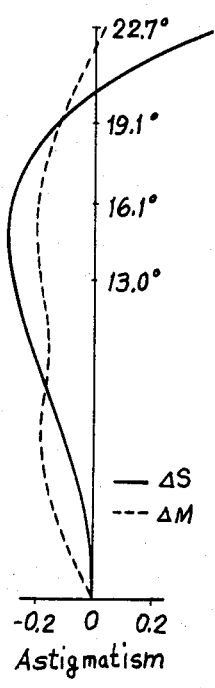

Referring to FIGS. 2A–2D, it will be seen that FIG. 2A shows curves for spherical aberration and the sine condition as illustrated. FIG. 2B illustrates chromatic aberration for the d-line and g-line. FIG. 2C illustrates the extremely low degree of distortion which is achieved with the objective of the invention, while astigmatism curves are illustrated in FIG. 2D.

What is claimed is:

1. A photographic objective having six lenses designated I–VI from the front to the rear and having lenses IV and V cemented together, and wherein the objective has the data of the following Table 1 for a focal length of 100 mm for the entire lens system:

TABLE 1

| Lens | F=100 mm | | | Glass Constants | |
|---|---|---|---|---|---|
| | | | | n | ν |
| I | $R_1$=+139.28 mm | | | | |
| | | $t_1$=6.99 mm | | 1.81600 | 46.8 |
| | $R_2$=−16328.50 mm | | | | |
| | | $d_1$=0.19 mm | | | |
| | $R_3$=+44.89 mm | | | | |
| II | | $t_2$=7.99 mm | | 1.81600 | 46.8 |
| | $R_4$=+94.93 mm | | | | |
| | | $d_2$=5.17 mm | | | |
| | $R_5$=+205.55 mm | | | | |
| III | | $t_3$=4.73 mm | | 1.72825 | 28.3 |
| | $R_6$=+34.83 mm | | | | |
| | | $d_3$=18.98 mm | | | |
| | $R_7$=−38.37 mm | | | | |
| IV | | $t_4$=4.82 mm | | 1.66680 | 33.1 |
| | $R_8$ = +728.12 mm | | | | |
| V | $R_9$=−52.83 mm | $t_5$=9.01 mm | | 1.81600 | 46.8 |
| | | $d_4$=0.19 mm | | | |
| | $R_{10}$=+460.21 mm | | | | |
| VI | | $t_6$=5.53 mm | | 1.81600 | 46.8 |
| | $R_{11}$=−109.11 mm | | | | |
| | $F_{1,2}$=62.12 mm | | | | |

* * * * *